US010089884B2

(12) United States Patent
Håkansson

(10) Patent No.: US 10,089,884 B2
(45) Date of Patent: Oct. 2, 2018

(54) AIRCRAFT IDENTIFICATION

(71) Applicant: ADB Safegate Sweden AB, Malmo (BE)

(72) Inventor: Ola Håkansson, Lomma (SE)

(73) Assignee: ADB SAFEGATE SWEDEN AB, Malmo (SE)

( * ) Notice: Subject to any disclaimer, the term of this patent is extended or adjusted under 35 U.S.C. 154(b) by 0 days.

(21) Appl. No.: 15/565,504

(22) PCT Filed: Apr. 8, 2016

(86) PCT No.: PCT/EP2016/057792
§ 371 (c)(1),
(2) Date: Oct. 10, 2017

(87) PCT Pub. No.: WO2016/162500
PCT Pub. Date: Oct. 13, 2016

(65) Prior Publication Data
US 2018/0082594 A1 Mar. 22, 2018

(30) Foreign Application Priority Data
Apr. 10, 2015 (EP) .................................... 15163205

(51) Int. Cl.
*G01C 21/00* (2006.01)
*G08G 5/00* (2006.01)
(Continued)

(52) U.S. Cl.
CPC ......... *G08G 5/0013* (2013.01); *G08G 5/0026* (2013.01); *G08G 5/045* (2013.01); *G08G 5/065* (2013.01)

(58) Field of Classification Search
CPC ..... G08G 5/0013; G08G 5/065; G08G 5/0043
(Continued)

(56) References Cited

U.S. PATENT DOCUMENTS 6,100,964 A * 8/2000 De Cremiers .......... B64F 1/002 340/958
6,324,489 B1 11/2001 Millgaard
(Continued)

FOREIGN PATENT DOCUMENTS

EP 0613109 A1 8/1994
EP 2660153 A2 11/2013

OTHER PUBLICATIONS

International Search Report dated Jun. 28, 2017 for PCT Application No. PCT/EP2016/057792.
(Continued)

*Primary Examiner* — Toan N Pham
(74) *Attorney, Agent, or Firm* — Moser Taboada

(57) ABSTRACT

The present invention relates to a method and system for identifying an aircraft in connection to a stand. The method comprises: receiving identification data and position data transmitted from an aircraft, comparing said received position data with at least one position within a predetermined area in connection to said stand. If said received position data correspond to said at least one position within said predetermined area: determining, based on said identification data, if said aircraft is expected at the stand, and if said aircraft is not expected at the stand: displaying a notification on a display.

12 Claims, 4 Drawing Sheets

(51) Int. Cl.
*G08G 5/06* (2006.01)
*G08G 5/04* (2006.01)

(58) Field of Classification Search
USPC .................. 340/971, 958, 945, 980; 14/71.5
See application file for complete search history.

(56) References Cited

U.S. PATENT DOCUMENTS

| | | | | |
|---|---|---|---|---|
| 6,807,511 | B2 * | 10/2004 | Millgård | B64F 1/305 340/958 |
| 7,702,453 | B2 * | 4/2010 | Hutton | B64F 1/002 342/357.31 |
| 8,942,915 | B2 * | 1/2015 | Thelander | B64F 1/002 244/114 R |
| 2008/0229525 | A1 | 9/2008 | Hutton | |
| 2017/0148333 | A1 * | 5/2017 | Alonso Tabares | G05D 1/0083 |

OTHER PUBLICATIONS

International Preliminary Report on Patentability completed Jun. 30, 2017 for PCT Application No. PCT/EP2016/057792.

* cited by examiner

AIRCRAFT IDENTIFICATION

TECHNICAL FIELD

The present invention generally relates to a method and a system for identifying an aircraft, and in particular to a method and system for identifying an aircraft in connection to approaching a stand.

BACKGROUND OF THE INVENTION

At an airport, each aircraft arriving at the airport is provided with a schedule describing, e.g., at which stand, i.e. a parking area for the aircraft, it is to arrive and at what time. An airport operational database (AODB) comprises information about arriving (and departing) aircraft, and in particular information about the type/and or version, the assigned stand and expected arrival time of each arriving aircraft. The AODB is connected to a Flight Information Display system (FIDS) in which a computer system controls mechanical or electronic display boards or TV screens in order to display arrivals and departures and optionally other flight information.

The information in the AODB and/or the FIDS can sometimes be incorrect which means that an aircraft might be directed to a stand which is prepared for a completely different aircraft type and/or version. In such a situation an arriving aircraft may accidentally be damaged in that e.g. a wing or other part of the aircraft may collide with luggage trucks at the stand, the connection bridge used for unloading the passengers on the aircraft, or even the terminal building itself. On top the fact that the costs for repairing a damaged aircraft are very high, a collision between an aircraft and any other object may also cause personal injury to personnel at the airport/aircraft as well as serious disturbances in the air traffic due to long repair times, re-scheduling of flights, etc.

Today most commercial aircraft are manufactured using a large amount of composite materials instead of light-weight metals as was dominant a few years back. If an aircraft comprising a fuselage made entirely or partially of composite material collides with a foreign object, e.g. at a stand, there is a great risk that the actual damage, e.g. small cracks in the composite material, will be very hard to locate by visual inspection only. Thus, due to the very high demands on safety, even an insignificant collision will call for extensive fault localization on the aircraft.

Some prior art aircraft docking systems try to solve this problem by displaying the expected aircraft type and/or version at the stand. However, the pilot might under unfortunate circumstances, e.g. due to mistake, choose to ignore this information and approach the stand anyway.

Alternatively, the information displayed by the docking system might be correct but the pilot drives the aircraft to the wrong stand, i.e. a stand assigned for another aircraft. Again, the aircraft then might accidentally be damaged in colliding with luggage trucks, the bridge, or even the terminal building.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for identifying an aircraft in connection to a stand comprising: receiving identification data and position data transmitted from an aircraft, comparing said received position data with at least one position within a predetermined area in connection to said stand, if said received position data correspond to said at least one position within said predetermined area: determining, based on said identification data, if said aircraft is expected or not at the stand, and if said aircraft is not expected at the stand: displaying a notification on a display.

The inventive method provides a means for minimizing the risk for accidents happening during an aircraft docking procedure. Furthermore, the risk for damaging the aircraft or other equipment such as, e.g., luggage wagons, and bridges is decreased.

The method may further comprise: comparing identification data of an aircraft expected at the stand with the identification data of said aircraft in order to determine if said aircraft is expected at the stand.

An advantage with this embodiment is that a reliable determination can be made based on any identification data related to the aircraft.

The method may further comprise: requesting a type and/or version of said aircraft from a translation database based on said identification data and comparing aircraft type and/or version of an aircraft expected at the stand with the type and/or version of said aircraft in order to determine if said aircraft is expected at the stand.

An advantage with this embodiment is that a reliable determination can be made based on the type and/or version of the aircraft.

The method may further comprise that said translation database is operatively coupled to an airport operational database.

An advantage with this embodiment is that data relating to the aircraft may easily be retrieved and a reliable association between the identification number of the aircraft and the type and/or version of the aircraft is provided.

The method may further comprise displaying a notification on a display including displaying any one of: an indication to stop said aircraft, an indication to approach the stand, and an indication to relocate said aircraft to another location.

An advantage with this embodiment is that the risk of accidents happening when an aircraft is approaching a stand is mitigated.

The method may further comprise, if an indication to approach the stand is displayed moving a bridge at the stand to a safe position, or setting a bridge at the stand to the type and/or version of said aircraft.

An advantage with this embodiment is that the risk of accidents happening when an aircraft is approaching a stand is further mitigated. A benefit on top of minimizing the risk of e.g. a collision between the aircraft and foreign objects, the movement of the bridge to a safe position that does not correspond to a full retraction of the bridge is that the time to dock the aircraft may be reduced.

The method may further comprise, if an indication to stop said aircraft, or if an indication to approach the stand is displayed: conveying relocation data to an aircraft expected at the stand.

An advantage with this embodiment is that the expected aircraft may be safely redirected to another location thereby minimizing the risk of accidents happening and/or disturbances occurring at the airport.

The method may further comprise: verifying the type and/or version of said aircraft using a laser verification system.

An advantage with this embodiment is that the type and/or version of the approaching aircraft may be more reliably determined.

According to a second aspect of the invention, the present invention is realized by an aircraft identification system for identifying an aircraft in connection to a stand comprising: a receiver being arranged to receive identification data and position data transmitted from an aircraft, a processor being arranged to compare said received position data with at least one position within a predetermined area in connection to said stand and determine if said received position data correspond to said at least one position within said predetermined area, the processor being arranged to determine, if said received position data correspond to said at least one position within said predetermined area, if said aircraft is expected or not at the stand based on said identification data, and the processor being arranged to instruct a display to display a notification if said aircraft is not expected at the stand.

The system may further comprise: the processor being arranged to compare identification data of an aircraft expected at the stand with the identification data of said aircraft in order to determine if said aircraft is expected at the stand.

The processor may be arranged to request a type and/or version of said aircraft from a translation database based on said identification data, and the processor may be arranged to compare aircraft type and/or version of an aircraft expected at the stand with the type and/or version of said aircraft. The translation database may be operatively coupled to an airport operational database.

The processor may be arranged to instruct the display any one of: an indication to stop said aircraft, an indication to approach the stand, and an indication to relocate said aircraft to another location.

The processor may be arranged to instruct a bridge control to move a bridge at the stand to a safe position, or the processor may be arranged to set the bridge to the type and/or version of said aircraft, if an indication to approach the stand is displayed.

The processor may be arranged to convey relocation data to the expected aircraft, if an indication to stop said aircraft or if an indication to approach the stand is displayed.

The system may comprise a laser verification system being arranged to verify the type and/or a version of said aircraft.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF PREFERRED EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the disclosure.

The present invention provides means for identifying an aircraft in connection to a stand, e.g. in the situation when an aircraft is approaching the stand. It further enables adaption of equipment at the stand to the approaching aircraft. Furthermore, errors in AODB may be handled in an efficient way. Additionally, problems associated with a pilot driving to the wrong stand may be solved.

The inventive method and/or system may be performed/connected in/to an aircraft docking system. Then the display mentioned in connection to the inventive system is the display of the aircraft docking system and the inventive system is connected to said display. Alternatively, the inventive method and/or system may comprise at least one aircraft docking system.

The term display is to be construed as a single display or a plurality of displays and the features of the display discussed herein may be implemented on one display or on several displays arranged in connection to each other. In one embodiment, a first display is arranged at an end of the stand in proximity to a stop position of the aircraft, such as on the outside wall of a terminal building, and a second display is arranged at a beginning of the stand, i.e. in proximity to the point of entry into the stand seen from the taxiway, or next to the taxiway close to the stand. The secondary display may also be referred to as additional display.

Alternatively, the display may be arranged in the cockpit of the aircraft such that the pilot may observe it as the aircraft approaches the stand.

The first display may display at least one of aircraft type, version, call sign, ICAO address, and distance to the stop position. The distance to the stop position may be measured using a laser ranging system. The first display may further display the position of an approaching aircraft in relation to a centerline of the stand at which the aircraft docking system is arranged. Such a system is disclosed e.g. in PCT/SE94/00968.

Figure 1:
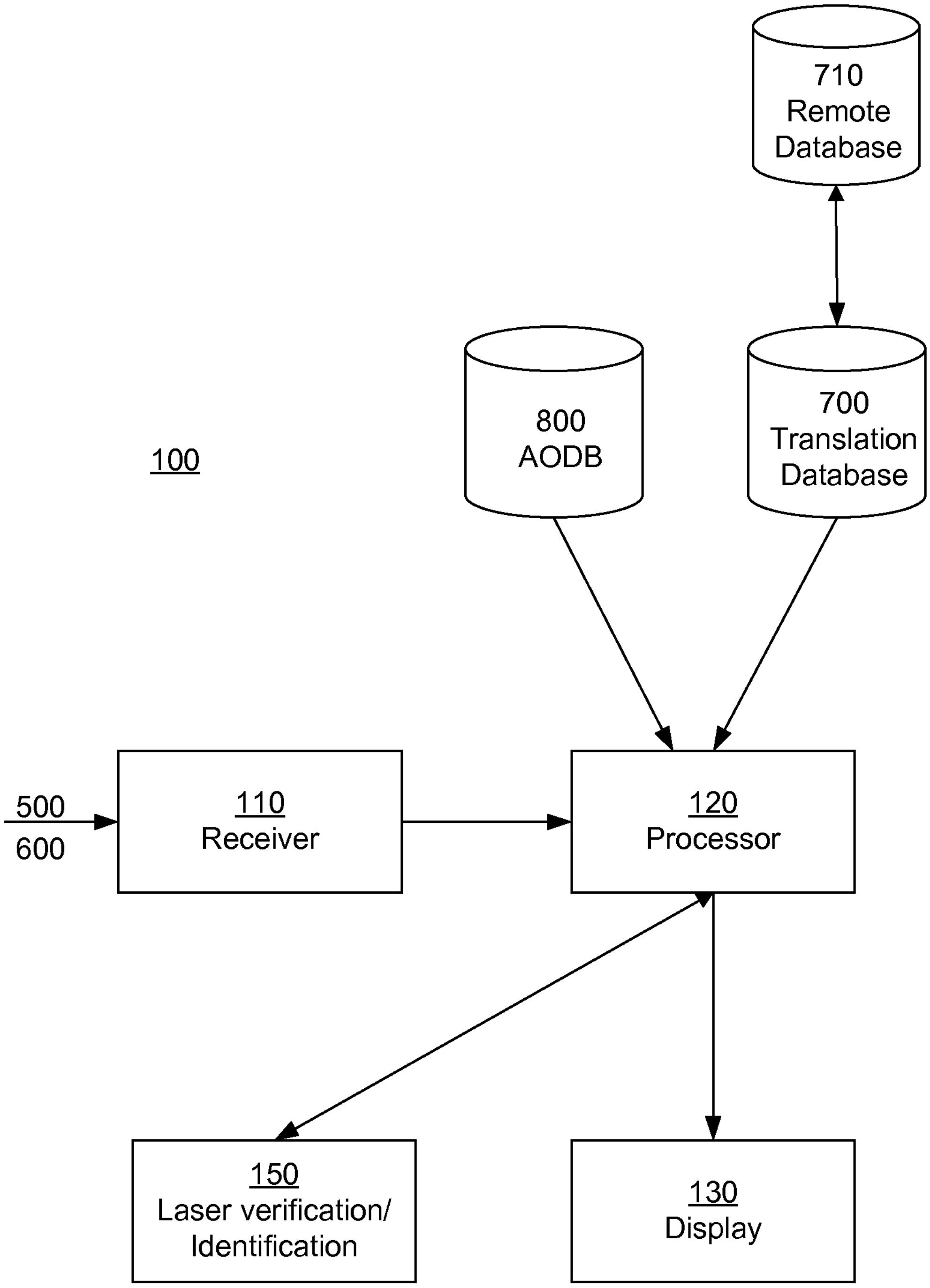
FIG. 1 is a schematic illustration of an embodiment of the inventive system.

For simplicity, in the following text the display will be described as one display including all the features disclosed above In the following, embodiments of the inventive aircraft identification system will be described. FIG. 1 is a schematic illustration of an embodiment of the inventive aircraft identification system for identifying an aircraft in connection to a stand.

The system 100 comprises a receiver 110, a processor 120 in communication with the receiver 110, and a display 130 in communication with the processor 120 as indicated by the arrows in FIG. 1. The receiver 110 is arranged to receive identification data 500, such as an identification number, and position data 600 transmitted from an aircraft. The identification data and position data may be transmitted using e.g., ADS-B or Mode-S. The identification number is preferably a unique number which may be represented in an appropriate base, such as binary, hex, octal decimal, etc, which identifies the aircraft. The identification number may also be represented by an alphanumeric string. Such an identification number is normally issued by a national aviation authority when the aircraft is registered. Even though such aircraft identification numbers are unique, some national aviation authorities allow it to be re-used when an aircraft is retired. According to a preferred embodiment of the present invention the identification number is stored in a translation database 700. The translation database also comprises aircraft data relating to the type and/or version of each aircraft stored therein. The translation database 700 provides a reliable association between the identification number and the type and/or version of an aircraft such that the processor 120 can request information as regards the type and/or version of an aircraft from the translation database 700 by providing an identification number.

The translation database 700 normally comprises data that is synchronized from a remote database 710 that is under the supervision of the national aviation authority.

Alternatively or additionally the identification data may e.g. be a flight number, ICAO designator for the aircraft operating agency followed by a flight number, registration marking of the aircraft (commonly the identification number in an alphanumeric format) and/or, call sign determined by military authorities. As will be disclosed in more detail below, the processor 120 is preferably operatively coupled to both the translation database 700 and an airport operational database (AODB) 800. In one embodiment the translation database 700 and the AODB 800 are arranged as one common database, wherein data relating to aircraft stored therein may be retrieved based on specific queries or requests. For simplicity of disclosure, the translation database 700 and the AODB 800 will be described as two entities in the following.

The position data may be determined using e.g. GPS (Global Positioning System) provided by a GPS positioning system on board the aircraft.

The position data may be determined using multilateration which provides an accurate location of an aircraft by using time difference of arrival (TDOA). Multilateration employs a number of ground stations, which are arranged at specific locations around an airport. The ground stations typically receive replies to interrogation signals transmitted from a local secondary surveillance radar or a multilateration station. Since the distance between the aircraft and each of the ground stations differ, the replies received by each station arrive at fractionally different times. Based on the individual time differences an aircraft's position may be precisely calculated. Multilateration normally uses replies from Mode A, C and S transponders, military Identification, friend or foe (IFF) and ADS-B transponders.

Figure 2:
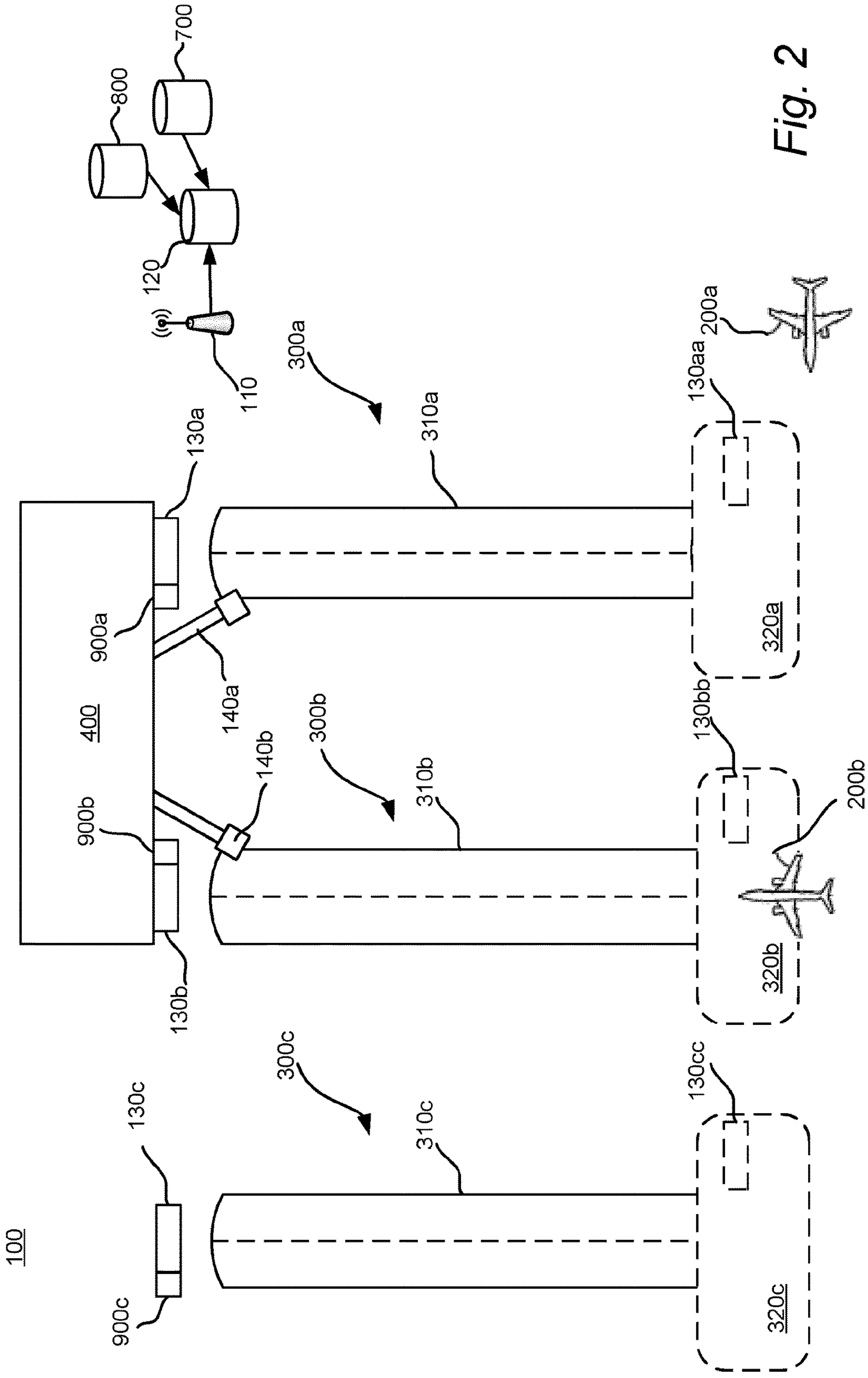
FIG. 2 is a schematic illustration of an embodiment of the inventive system.

The system will now be described with reference to both FIGS. 1 and 2. FIG. 2 illustrates an embodiment of the inventive aircraft identification system. The system 100 comprises the receiver 110 and processor 120 of FIG. 1. Even though FIG. 2 only comprises one receiver, it is to be noted that the system may comprise a plurality of receivers. The processor may be realized as a plurality of computer processing units that together form the processor, i.e. a plurality of computers may be interconnected in order to form the processor and its functionality as disclosed herein. The function of the processor may be shared between a plurality of units at the airport. The system 101 further comprises displays 130*a-c* and, optionally, displays 130*aa*-130*cc*.

FIG. 2 also illustrates a terminal building 400, aircraft 200*a-b* that are about to dock, stands 300*a-c*, stand areas 310*a-c*, and additional areas 320*aa-cc*. Each stand 130*a, b* may comprise a bridge 140*a, b* for docking the aircraft to the terminal building 400.

At an airport, arriving aircraft travel from the runway along a taxi-strip towards the airport buildings, such as the main buildings 400 or hangars, and the stands 300 where the aircraft are parked. The stands may be located close to or remote from the main buildings, i.e. the stands define a parking area for aircraft anywhere at the airport. The taxi-strip is normally indicated on the tarmac by a painted taxi-line which aids the pilot in steering the aircraft towards the stands 300. At the stands 300 the taxi-line normally splits up into centre lines, each of which enters into the respective stand 300 and ends at the stopping point for the aircraft. Normally, each stand is provided with one or more centre lines in order to allow aircraft of different sizes to safely approach the stopping point by following the appropriate centre line. In connection to each stand 300 an area may be determined. This area is preferably defined as starting at the point where the taxi-line splits up into the one or more centre lines and stretches a bit past the stopping point. The area preferably stretches crosswise from the centre line and ends at a safe distance from the neighboring stands and/or buildings such that the risk that any part of the airplane collides with any foreign object is minimized.

The processor 120 is arranged to compare the position data received from each of the aircraft 200*a-b* with at least one position within a predetermined area, such as the area defined above, in connection to the stand 300 to which each aircraft is designated. The predetermined area is e.g. set upon installing the system. The predetermined area may be set to be equivalent to the area of the stand. As an alternative, the predetermined area may be set to comprise the area of stand 310 and an additional area 320. The additional area may, e.g., be a part of the taxiway being closest to the stand. The predetermined area may, e.g., be set so that it is relatively sure to which stand the aircraft is heading. The predetermined area may be of rectangular shape with a length and width set in accordance to the available space reserved for each stand. The predetermined area may be of other shapes such as polygon shape, circular, elliptical, etc. depending on the deployment of stands at the airport. The predetermined area may be defined by a geo-fence, i.e. a virtual perimeter for a real-world geographic area at the stand, or as one or more geographic points residing within a real-world geographic area at the stand.

If the received position data correspond to the at least one position within the predetermined area, the processor is arranged to determine, based on the identification data, if the aircraft is expected at the stand.

In one embodiment, the processor is arranged to compare the identification number of the expected aircraft with the identification number of the approaching aircraft. In addition to or as an alternative, the processor is arranged to compare aircraft type and/or version of the expected aircraft with the type and/or version of the approaching aircraft. To this end, the processor is arranged to extract a type and/or version of the aircraft from the AODB or the translation database 700 based on the identification data.

As indicated above, the translation database 700 is preferably operatively coupled to the AODB 800 in order to provide a reliable association between an aircraft identification number and the corresponding type and/or version of the aircraft. In addition to or as an alternative, the AODB may also comprise data that links a specific identification number of an aircraft to the type and/or version of the aircraft. In a preferred embodiment, based on the identification data 500 received by the receiver 110, the processor is arranged to request from the AODB 800 or the translation database 700, either by wire or via wireless communication (e.g. Wi-Fi or other radio communication), type and/or version corresponding to the identification data 500 of the aircraft. The AODB 800 and/or translation database may be locally stored at, or remote from, the airport. The AODB 800 and/or translation database may be connected and shared between a plurality of airports.

As mentioned above, the translation database 700 normally comprises data that is synchronized from a remote database 710 that is under the supervision of the national aviation authority. The data may be synchronized with very short intervals, such as every second, minute or hour, or more infrequently, such as every day, week or month. The data in the remote database is updated by the national aviation authority e.g. when a new aircraft is registered in the database. However, the time it takes for the national aviation authority to fully process the registration of a new aircraft, i.e. the time from a registration request is filed by e.g. an airline corporation until the remote database is updated (even though the registration has been granted), may take many weeks or even months. Additionally, as mentioned above, some national aviation authorities allow identification numbers to be re-used when an aircraft is retired, which may result in that local copies of the database may lack the identification data or even have incorrect data during a time period.

Figure 3A:
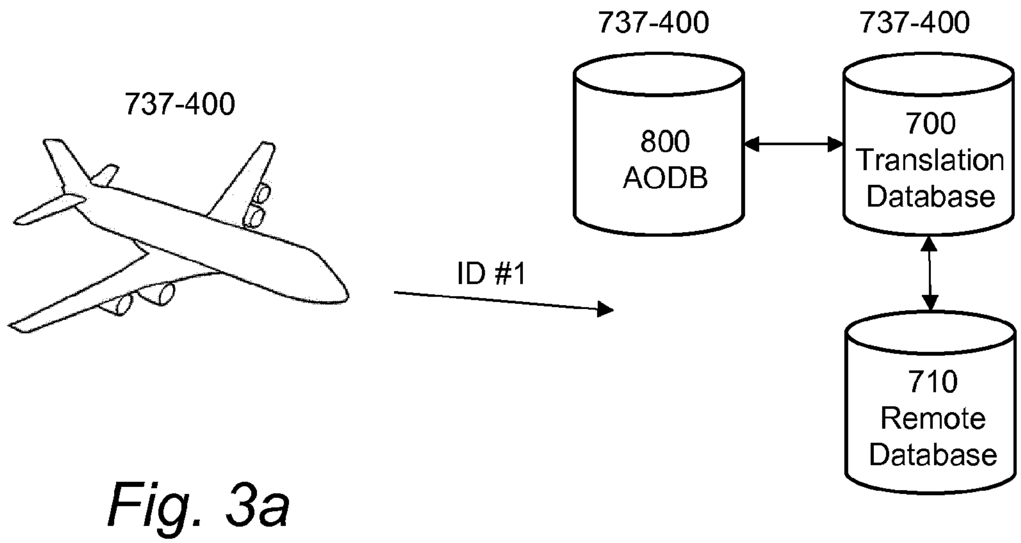
FIGS. 3*a-d* are schematic illustrations of a part of an embodiment of the inventive system.

Reference to FIG. 3*a*, in one embodiment the processor 120 is arranged to compare the type and/or version from the translation database 700 and the AODB 700. The data relating to the type and/or version of the aircraft stored in the AODB 800 may be based e.g. on a flight plan for the aircraft. By way of example, the flight plan for the aircraft may have been established a few months before the aircraft was planned to arrive at the airport and comprises i.a. that the aircraft planned for the flight is of the type 737-400.

In a first example, illustrated in FIG. 3*a*, on arrival at the airport the aircraft transmits its identification data (e.g. the identification number disclosed above) to the system in FIG. 1, which is partially disclosed in FIG. 3*a* for reasons of clarity. The identification data, illustrated as "#1" in FIG. 3*a* is forwarded to the translation database 700 which translates the identification number to a type and/version of the aircraft. The translation is based on the registration made by the national aviation authority. Upon retrieval of the translated type and/or version of the aircraft the processor compares data retrieved from the AODB 800 and the translation database 700 and if the type and/or version match there is a high likelihood that the type and/or version of the aircraft is 737-400. In order to increase the safety even more, the processor may instruct the laser verification/identification system 150 to verify that the aircraft is a 737-400 as the aircraft approaches the stand.

Figure 3B:
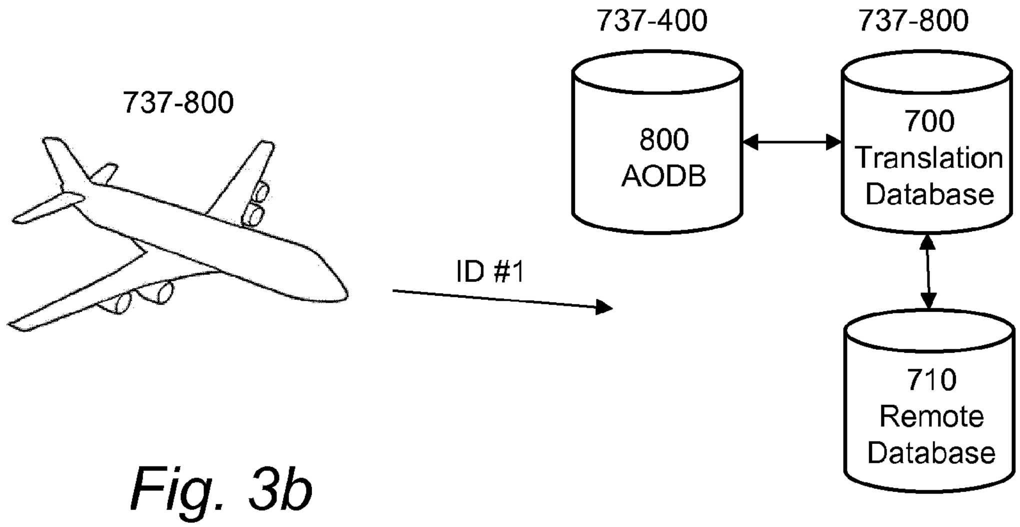

In a second example, illustrated in FIG. 3*b*, it may be that the flight plan has been changed after its initial establishment. By way of example the type and/or version of the aircraft may have been changed at a late stage due to e.g. that the number of passengers has increased or decreased. The updated flight plan may thus comprise that the type and/or version of the aircraft is e.g. 737-800.

In some situations the AODB 800 has not been updated with the new flight plan and hence still comprises that the type and/or version of the arriving aircraft is 737-400. As in the example above, on arrival at the airport the aircraft transmits its identification data to the system in FIG. 1. The identification data, illustrated as "#1" in FIG. 3*b* is forwarded to the translation database 700 which correctly translates the identification number to 737-800. When the processor compares the translated type and/or version of the aircraft with the data retrieved from the AODB 800 a mismatch is identified since the AODB reports 737-400 while the translation database reports 737-800.

The processor may in this situation instruct the laser verification/identification system 150 to verify whether the approaching aircraft is of version and/or type 737-400 or 737-800. As will be disclosed in more detail below, this situation may be handled safely by the inventive system.

Figure 3C:
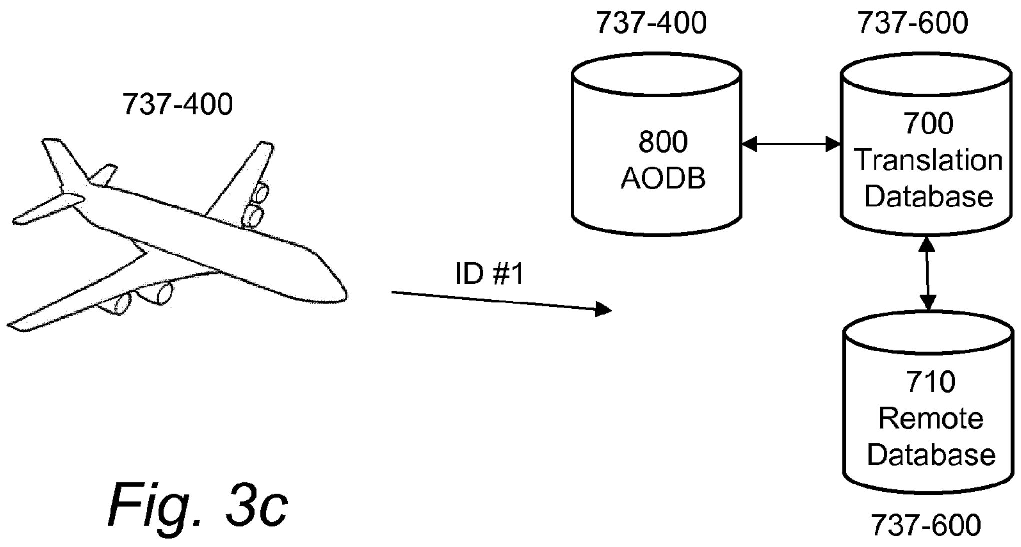

In a third example, illustrated in FIG. 3*c*, the flight plan has not changed and the type and/or version of the approaching aircraft corresponds to the type and/or version stored in the AODB 800.

However, since the data in the translation database 700 is normally synced with the remote database 710, any error in the remote database will be mirrored in the translation database 700. The error may have its origin in a human error, i.e. the person entering data into the remote database makes an error while typing, or may reside in that a new aircraft has been registered but the database has not been updated. This situation may also arise even if there is no synchronization between the translation database 700 and the remote database 710, but the error has been introduced directly in the translation database 700, e.g. by human error when entering data into the database.

As in the example above, on arrival at the airport the aircraft transmits its identification data to the system in FIG. 1. The identification data, illustrated as "#1" in FIG. 3*c* is forwarded to the translation database 700 which, due to the error in the database incorrectly translates the identification number to 737-600. When the processor compares the translated type and/or version of the aircraft with the data retrieved from the AODB 800 a mismatch is identified since the AODB reports 737-400 while the translation database reports 737-600.

The processor may in this situation instruct the laser verification/identification system 150 to verify whether the approaching aircraft is of type and/or version 737-400 or 737-600. As will be disclosed in more detail below, this situation may also be handled safely by the inventive system.

Figure 3D:
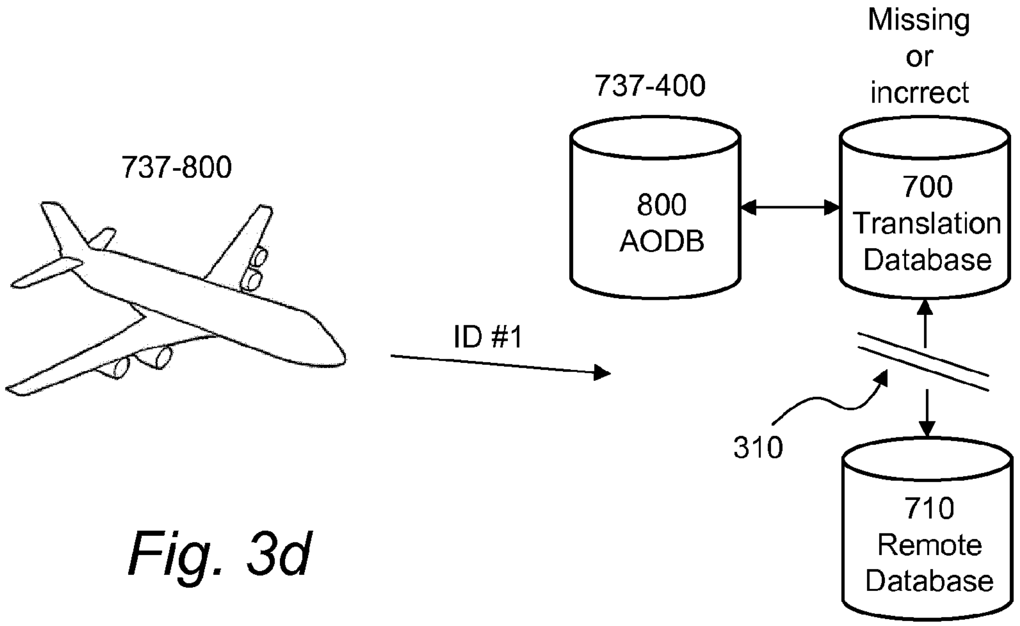

In a fourth example, illustrated in FIG. 3*d*, the flight plan has not changed and the type and/or version of the approaching aircraft corresponds to the type and/or version stored in the AODB 800.

However, it may be that a communication error 310 is present between the translation database 700 and the remote database 710. This may result in that data relating to a specific identification number, illustrated as "#1" in FIG. 3*d*, is missing or incorrect in the translation database 700. Missing or incorrect data in the translation database may also be the result of an operational error in the translation database 700.

As in the example above, on arrival at the airport the aircraft transmits its identification data to the system in FIG. 1. The identification data, illustrated as "#1" in FIG. 3*d* is forwarded to the translation database 700 which, due to the missing or incorrect data in the database returns an incorrect type and/or version or does not return any result at all. When the processor compares the translated type and/or version of the aircraft with the data retrieved from the AODB 800 a mismatch is identified since the AODB reports 737-400 while the translation database reports a different type or nothing at all.

The processor may in this situation instruct the laser verification/identification system 150 to verify if the approaching aircraft is of type and/or version 737-400. As will be disclosed in more detail below, this situation may also be handled safely by the inventive system.

If the type and/or version from the translation database 700 and the AODB 800 do not correspond to each other, the processor may be arranged to send a warning, either via radio and/or by signaling using the display, to a pilot of the approaching aircraft and/or a control tower. The processor may also be arranged to send a request for type and/or version of the aircraft to the pilot of the aircraft. The warning may, e.g. be sent as a text message, that is displayed in a display in the aircraft and/or control tower. Alternatively, the warning may be a prerecorded message and sent over radio to the aircraft and/or control tower or played in loudspeakers at the airport.

By using the laser verification/identification system 150 to verify the type and/or version of the approaching aircraft the safety level is increased since any ambiguity between results received as to the type and/or version of the approaching aircraft may be resolved. This is also applicable in the case where the results from the databases correspond to each other, where the laser verification/identification system 150 will catch any errors present in both databases and provide information to the processor such that necessary measures, as disclosed below, may be taken. The cooperation between the AODB 800, translation database 700 and the laser verification/identification system 150 provides an extremely high safety level when receiving an aircraft at the stand.

The display 130 is arranged to display a notification on the display if the aircraft is not expected at the stand. The notification may be any one of: an indication to stop the aircraft, an indication to approach the stand, and an indication to convey the aircraft to another location. The notification may be displayed at any one of the first displays 130*a*-130*c* or any one of the second displays 130*aa*-130*cc*. In one embodiment, the notification is displayed on both a first display and a second display.

If the system decides that an indication to approach the stand is to be displayed, in one embodiment, the processor is arranged to instruct a bridge control to retract a bridge 140*a, b* at the stand. In a preferred embodiment the bridge 140*a, b* is moved to a safe position which minimizes the risk of a collision between the bridge 140*a, b* and the approaching aircraft. A safe position may be a full retraction of the bridge 140*a, b* should the difference between the approaching aircraft and the expected be great, defined by the size of the aircraft, or a partial retraction/movement should the type and/or version of the aircraft be similar. An algorithm for determining the safe position of the bridge 140*a, b* preferably takes into account both the dimensions of the aircraft as well as the relative placement of motors, wings, etc. Alternatively, the processor is arranged to set the bridge 140*a, b* to the type and/or version of the aircraft. The processor may be arranged to update the database with the type and/or version of the aircraft. Thereby, displays in the AODB and/or FIDS may be updated accordingly.

The processor may be arranged to transmit relocation data to the expected aircraft. The relocation data may, e.g., be "go to stand 7". The relocation data is then preferably displayed on a display in the aircraft. Alternatively the relocation data may be presented on the first and/or second display.

If the aircraft is expected at the stand, the first display may be arranged to display at least one of aircraft type, version, call sign, ICAO address, and distance to stop position.

As mentioned above, the pilot may irrespective of whether the approaching aircraft is expected or not be invited to communicate type and/or version of the aircraft to the system via radio, and/or an input interface in communication with the processor.

The system may comprise a laser verification/identification system 900*a-c* being arranged to verify the type and/or a version of the aircraft. Such a system is disclosed e.g. in PCT/SE94/00968 and U.S. Pat. No. 6,563,432.

If the type and/or version obtained by the laser verification/identification system does not correspond to the type and/or version retrieved from any of the databases, the processor may be arranged to instruct a bridge control to move a bridge at the stand to a safe position in order to mitigate the risk of collision with the aircraft. Additionally, the processor may be arranged to instruct the bridge control to set the bridge to the type and/or version of the aircraft obtained by the laser identification system.

In the following, a scenario will be described in which the expected aircraft approaches the scheduled stand.

The aircraft 200*a* continuously transmits (broadcast) at least its identification data 500 and position data 600. The receiver 110 receives the identification data 500 and position data 600 and forwards the data to the processor 120. The processor 120 compares the received position data with at least one position within the predetermined area in connection to the stand. In this example, the predetermined area comprises the stand area 310*a* and the additional area 320*a*. As the aircraft 200*a* enters the predetermined area 310*a*, 320*a*, the processor 120 compares the identification data, type and/or version of the aircraft with the identification data, type and/or version of the expected aircraft and if the comparison is positive, it is determined that the approaching aircraft is the expected aircraft. As disclosed above, the processor is arranged to retrieve the identification data, type and/or version of the expected aircraft from the identification database 700 and/or the AODB 800.

Since, in this case, the aircraft 200*a* is expected at the stand 300*a*, the display 130*a* is arranged to display at least one of aircraft type, version, call sign, ICAO address, and distance to stop position. Since it is determined that the approaching aircraft is the expected aircraft, the system may choose not use the laser verification/identification system 900*a* for verifying the type and/or a version of the aircraft.

Optionally, the system comprises an additional display 130*aa* arranged in the additional area 320*a*. Since, in this case, the aircraft 200*a* is expected at the stand 300*a*, the additional display 130*aa* may display a welcoming and/or acknowledging notification to the expected and approaching aircraft 200*a*.

In the following, a plurality of scenarios will be described in which the aircraft 200*b* that is approaching the stand 300*b* is not the expected aircraft 200*a*. This situation may arise e.g. if the pilot is preoccupied.

As in the previous case, the aircraft 200*b* continuously transmits (broadcast) at least its identification data 500 and position data 600. The receiver 110 receives the identification data 500 and position data 600 and forwards the data to the processor 120. The processor 120 compares the received position data with at least one position within the predetermined area in connection to the stand. In this example, the predetermined area comprises the stand area 310*b* and the additional area 320*b*.

As the aircraft enters the predetermined area 310*b*, 320*b*, the processor 120 compares the identification data, type and/or version of the aircraft 200*b* with the identification data, type and/or version of the expected aircraft. The processor 120 is arranged to retrieve the identification data, type and/or version of the expected aircraft from the translation database 700 and/or the AODB 800. Since the comparison results in a mismatch, the system may come to the conclusion that the aircraft 200*b* is not the expected aircraft.

As a precautionary measure, the system may use the laser verification/identification system 900*b* for verifying/identifying if the type and/or a version of the aircraft 200*b* corresponds to the expected aircraft, which information could be used by the processor to determine whether or not to allow the aircraft to approach the stand.

Since, in this case, the aircraft 200*b* is not expected at the stand, the display 130*b* is arranged to display any one of an indication to stop the aircraft (such as "STOP", "HALT" or similar), an indication to approach the stand, and an indication to relocate the aircraft to another location, e.g. stand 300*c*. As an alternative, or as a combination, the additional display 130*bb* may be arranged to display any one of an indication to stop the aircraft, an indication to approach the stand, and an indication to relocate the aircraft to another location. Before displaying the indication to relocate the aircraft to another location, the system determines this other location by, e.g., checking with the AODB 800 for available stands.

In the event of the approaching aircraft 200*b* is not the expected aircraft but being of the same type and/or version as the expected aircraft 200*a*, the system may decide to let the aircraft approach the stand 200*b* anyway.

Since the approaching aircraft is of the same type and/or version as the expected aircraft no reconfiguration of e.g. the bridge will be needed at the stand in order to receive the aircraft.

Optionally, the additional display 130*bb* displays an indication to approach the stand 200*b*. The display 130*b* at the stand 200*b* is arranged to display at least one of aircraft type, version, call sign, ICAO address, and distance to stop position for the approaching (incorrect) aircraft 200*b*.

The system is preferably arranged to update the AODB 800 with at least one of identification data, type and version of the incorrect aircraft. The system is then further arranged to inform the ground personnel, the airport control, and the pilot. Furthermore, the system is arranged to convey relocation data to the expected aircraft by, e.g., using ADS-B or, displaying a notification in the additional display 130*bb* (preferably if the aircraft 200*b* has passed the display 130*bb*).

In the event of the approaching aircraft 200*b* not being of the same type and/or version as the expected aircraft 200*a*, but the aircraft 200*b* having travelled so far that it is difficult to have it relocated to another stand, the system may decide to let the aircraft 200*b* approach the stand 300*b* (which is not the scheduled stand for the aircraft 200*b*) anyway.

This decision may be based on how far into the predetermined area the aircraft has travelled, the amount of reconfiguration needed at the stand in order to receive the aircraft, whether there are any other stands available, etc.

In making this decision the system 100 may also take into account the type and/or version of the aircraft in neighboring stands. This information may e.g. be retrieved from flight plans available in the AODB 800. For example, if an aircraft in a neighboring stand has a size such that a collision may not be ruled out with a certain degree of certainty should the approaching aircraft 200*b* be allowed to enter into the stand area, the system may decide to display "STOP" on the display 130*b*.

Irrespective of the situation, the main focus in this decision is on safety. That is the safety of the aircraft, personnel or equipment at the airport must not be compromised. By way of example, if a long aircraft is approaching a stand at which it is not expected, the system may decide to let the aircraft in a safe manner approach the stand even though it will not be possible to dock the aircraft at the stand (possibly by taking into account the aircraft present in the neighboring stands). The processor will then instruct the display to guide the plane forward a distance, determined by the size of the aircraft, into the stand area such that an as small as possible portion of the aircraft remains in the taxiway close to the stand, thereby minimizing the risk of a collision with another aircraft passing by on the taxiway.

Should it be decided that it is possible to reconfigure the stand to receive the approaching aircraft, the additional display 130*bb* displays an indication to approach the stand 300*b*. The display 130*b* at the stand is arranged to display at least one of aircraft type, version, call sign, ICAO address, and distance to stop position for the approaching (incorrect) aircraft. Furthermore, the processor 120 is arranged to set the bridge to the type and/or version of the incorrect aircraft.

The system is arranged to update the AODB 800 with at least one of identification data, type and version of the incorrect aircraft 200*b*. The system is then further arranged to inform the ground personnel, the airport control, and the pilot. Furthermore, the system is arranged to convey relocation data to the expected aircraft 200*a* by, e.g., displaying a notification in the additional display or on a display in the aircraft.

In one embodiment, in the event of the approaching aircraft 200*b* not being of the same type and/or version as the expected aircraft 200*a*, the system may decide to display an indication to stop the aircraft (such as "STOP", "HALT" or similar). The reason may be, e.g., that the system needs time to access the situation or to set the bridge to the incorrect aircraft 200*b*. If the pilot decides to continue into the stand 300*b* anyway, the processor 120 may be arranged to try to minimize the risk for accidents by, e.g., instructing a bridge control to move the bridge at the stand 300*b* to a safe position as described above.

The system may be arranged to update the AODB 800 with at least one of identification data, type and version of the incorrect aircraft. The system may then further be arranged to inform the ground personnel, the airport control, and the pilot. Furthermore, the system may be arranged to convey relocation data to the expected aircraft by, e.g., displaying a notification in the additional display 130*bb* or on a display in the aircraft.

In the following, it will be described a scenario in which there is an error or inconsistency in the data in the databases 700 and 800. The expected aircraft 200*a* approaches the scheduled stand 200*a*. The aircraft 200*a* continuously transmits (broadcast) at least its identification data and position data. The receiver 110 receives identification data and position data and the processor 120 compares the received position data with at least one position within the predetermined area 310*a*, 130*a* in connection to the stand 300*a*. As the aircraft 200*a* enters the predetermined area 310*a*, 130*a*, the processor 120 compares the identification data, type and/or version of the aircraft 200*a* with the identification data, type and/or version of the expected aircraft retrieved from the databases 700 and 800.

Even though the aircraft 200*a* is the expected aircraft, in this scenario there has been an error when the information was entered into the AODB 700 (e.g. an error was initially introduced into the flight plan, or a subsequent change has been made in the flight plan) so the aircraft 200*a* approaching the stand does not match what is expected according to the AODB 800. As an example, when inputting the identification data in the AODB 800, an incorrect type and/or version was associated with the identification data.

As disclosed above, the processor 120 is in communication with the AODB 800 and the translation database 700. When the processor 120 receives an identification number from an aircraft, the normal procedure is to access the translation database 700 in order to retrieve the type and/or version of the aircraft based on the identification number. This retrieved type and/or version may then be compared to the type and/or version registered in the flight plan in the AODB 800 In this case, the compared types and/or versions do not match since an error has been introduced into the AODB 800. The system may decide that the type and/or version in the translation database 700 is correct and therefore be arranged to update information in the AODB 800 based on the type and/or version received from the translation database 700.

The system may further be arranged to send a warning to a pilot of the aircraft 200*a* and/or a control tower. Additionally, the system may be arranged to send a request for type and/or version of the aircraft 200*a* to the pilot of the aircraft in order to obtain a further confirmation that the type and/or version in the translation database 700 is correct.

Since it is now confirmed that the approaching aircraft 200*a* is also the expected aircraft, the display 130*a* is arranged to display at least one of aircraft type, version, call sign, ICAO address, and distance to stop position of the approaching (which is also the expected) aircraft. However, if the bridge is set to a different type and/or version, due to the error in the AODB 800, the display 130*a* and/or 130*aa* may be arranged to display stop. Furthermore, the system may be arranged to instruct a bridge control to move a bridge at the stand to a safe position. Alternatively, the system may be arranged to instruct the bridge control to set the bridge to the type and/or version of the aircraft obtained from the translation database 700.

The system may use the laser verification/identification system 900*a* in order to verify/identify type and/or a version of the aircraft 200*a*. That is, the processor 120 may initially assume that the information in the translation database 700 is correct and request a verification of this assumption from the laser verification/identification system 900*a*. In one embodiment, the system is arranged to update the AODB 800 based on the type and/or version confirmed by the laser identification system 900*a*. The processor 120 may also initially assume that the information in the AODB 800 is correct and request a verification of this assumption from the laser verification/identification system 900*a*. Thus, the result from the laser identification decides whether it is the AODB 800 or the translation database 700 that has the correct entry.

If the bridge is set to a different type and/or version, due to the error in the translation database 700 and/or the AODB 800, the processor may be arranged to instruct the display 130*a* and/or 130*aa* to display stop and the system may be arranged to instruct a bridge control to move a bridge at the stand to a safe position.

Alternatively, the system may be arranged to instruct the bridge control to set the bridge to the type and/or version of the aircraft obtained by the laser identification system 900*a*. The display 130*a* is then arranged to display at least one of aircraft type, version, call sign, ICAO address, and distance to stop position of the approaching (which is also the expected) aircraft.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. Method, implemented in an aircraft docking system comprising a receiver, a processor and a display, for identifying an aircraft in connection to a stand having a predetermined area, said method characterised by:

the receiver receiving identification data and position data transmitted from an approaching aircraft, the processor receiving information data from a ground-based system pertaining to at least: information data of aircrafts in neighboring stands, and information data of availability of other stands, the processor comparing said received position data with at least one position within a predetermined area comprising said area of the stand, if said received position data correspond to said at least one position within said predetermined area:

the processor comparing identification data of an aircraft expected at the stand with the identification data of said approaching aircraft and determining if said approaching aircraft is expected or not at the stand, if said approaching aircraft is not expected at the stand:

the processor deciding to stop said approaching aircraft, to let said approaching aircraft approach the stand, or to relocate said approaching aircraft to another location, wherein said decision is based on the received data, and the display, receiving said decision, and based on the decision displaying a notification selected from one of:

an indication to stop said approaching aircraft, an indication to approach the stand, or an indication to relocate said approaching aircraft to another location.

2. Method according to claim 1, wherein determining if said aircraft is expected at the stand comprises: the processor requesting at least one of a type or a version of said approaching aircraft from a translation database based on said identification data and the processor comparing at least one of aircraft type or a version of said aircraft expected at the stand with the at least one of the type or the version of said approaching aircraft.

3. Method according to claim 2, wherein said translation database is operatively coupled to an airport operational database.

4. Method according to claim 3, further comprising if an indication to approach the stand is displayed: the processor instructing a bridge control to move a bridge at the stand to a safe position, or setting the bridge at the stand to the at least one of the type or the version of said approaching aircraft.

5. Method according to claim 4, further comprising if an indication to stop said approaching aircraft, or if an indication to approach the stand is displayed: the processor conveying relocation data to said aircraft expected at the stand.

6. Method according to claim 2, further comprising: the aircraft docking system verifying the at least one of the type or the version of said approaching aircraft using a laser verification system.

7. Aircraft identification system for identifying an aircraft in connection to a stand characterised by:

a receiver being arranged to receive identification data and position data transmitted from an approaching aircraft, a processor being arranged to receive information data from a ground-based system pertaining to at least:

information data of aircrafts in neighboring stands, and information data of availability of other stands, the processor being arranged to compare said received position data with at least one position within a predetermined area in connection to said stand and determine if said received position data correspond to said at least one position within said predetermined area, the processor being arranged to compare identification data of an aircraft expected at the stand with the identification data of said approaching aircraft and determine, if said received position data correspond to said at least one position within said predetermined area, if said approaching aircraft is expected or not at the stand, the processor being arranged to decide to stop said approaching aircraft, to let said approaching aircraft approach the stand, or to relocate said approaching aircraft to another location, wherein said decision is based on the received data, and the processor being arranged to transmit said decision to a display and instruct the display to display a notification if said approaching aircraft is not expected at the stand, wherein the processor being arranged to instruct the display to display a notification selected from one of:

an indication to stop said approaching aircraft, an indication to approach the stand, or an indication to relocate said approaching aircraft to another location.

8. Aircraft identification system according to claim 7, wherein said processor being arranged to determine if said aircraft is expected further comprises:

said processor being arranged to request at least one of a type or a version of said approaching aircraft from a translation database based on said identification data, and said processor being arranged to compare at least one of an aircraft type or a version of an aircraft expected at the stand with the at least one of the type or the version of said approaching aircraft.

9. Aircraft identification system according to claim 8, wherein the translation database is operatively coupled to an airport operational database.

10. Aircraft identification system according to claim 9, further comprising: the processor being arranged to instruct a bridge control to move a bridge at the stand to a safe position, or the processor being arranged to set the bridge to the at least one of the type or the version of said aircraft, if an indication to approach the stand is displayed.

11. Aircraft identification system according to claim 10, further comprising: the processor being arranged to convey relocation data to said aircraft expected at the stand, if an indication to stop said approaching aircraft or if an indication to approach the stand is displayed.

12. Aircraft identification system according to claim 8, further comprising: a laser verification system being arranged to verify the at least one of the type or the version of said approaching aircraft.

* * * * *